United States Patent
Shinn (10) Patent No.: US 11,939,178 B2
(45) Date of Patent: Mar. 26, 2024

(54) DEVICE FOR WINDING UP CARGO TIES COMPRISING SPRING-LOADED CLAMP

(71) Applicant: Shawn Shinn, Lancaster, OH (US)

(72) Inventor: Shawn Shinn, Lancaster, OH (US)

( * ) Notice: Subject to any disclaimer, the term of this patent is extended or adjusted under 35 U.S.C. 154(b) by 233 days.

(21) Appl. No.: 17/514,754

(22) Filed: Oct. 29, 2021

(65) Prior Publication Data
US 2022/0135357 A1 May 5, 2022

Related U.S. Application Data (60) Provisional application No. 63/107,526, filed on Oct. 30, 2020.

(51) Int. Cl.
*B65H 18/08* (2006.01)

(52) U.S. Cl.
CPC .......... *B65H 18/08* (2013.01); *B65H 2601/30* (2013.01)

(58) Field of Classification Search
None
See application file for complete search history.

(56) References Cited

U.S. PATENT DOCUMENTS

| | | | | | |
|---|---|---|---|---|---|
| 498,307 | A * | 5/1893 | Rule | ................... | B65H 75/44 242/406 |
| 2,629,197 | A * | 2/1953 | Duvall | ................... | A01K 91/18 242/402 |
| 3,946,964 | A * | 3/1976 | Zinser | ................... | B65H 54/585 242/395 |
| 4,311,288 | A * | 1/1982 | Galland | ............... | B65H 54/585 242/399 |
| 4,390,141 | A * | 6/1983 | Webster | ............... | B60P 7/0846 242/395 |
| 5,961,061 | A * | 10/1999 | Stanley | ............... | B65H 54/585 242/395 |
| 5,993,127 | A | 11/1999 | Shinn | | |
| 7,766,270 | B2 * | 8/2010 | Piepgras | .............. | B65H 54/585 242/395 |
| 8,192,119 | B1 * | 6/2012 | Small | .................. | B60P 7/0846 410/103 |
| 9,902,589 | B2 * | 2/2018 | Gregory | ............... | B65H 54/585 |
| 10,927,924 | B2 * | 2/2021 | Bujold | .................. | F16H 1/16 |
| 2007/0075177 | A1 * | 4/2007 | Mehrer | .................. | B65B 13/025 242/532.6 |
| 2016/0339830 | A1 * | 11/2016 | McLemore | ........... | B65H 54/585 |
| 2017/0166106 | A1 * | 6/2017 | Fernandez | ........... | B65H 54/585 |
| 2022/0063478 | A1 * | 3/2022 | LeBrun | ................. | B60P 7/0853 |
| 2022/0134938 | A1 * | 5/2022 | Higo | .................... | B65H 18/026 242/370 |

* cited by examiner

*Primary Examiner* — William A. Rivera
(74) *Attorney, Agent, or Firm* — Standley Law Group LLP; Beverly A. Marsh; Kenny W. Pung (57) ABSTRACT

A device for neatly winding up cargo ties includes a moveable clamp arm a first end of which projects out of an opening of the housing such that the clamp arm and the housing together form a pair of jaws that can selectively be placed about a variety of surfaces and tightened. The jaws are loosened and tightened through the rotation of a threaded rod that engages with a second end of the clamp arm at the interior of the housing causing movement of the clamp arm along a clamping axis. In some embodiments, a nut which is prevented from rotating, is disposed at the second end of the clamp arm and comprises threading that engages with the threading on the threaded rod moving the clamp arm along the clamping axis.

19 Claims, 6 Drawing Sheets

DEVICE FOR WINDING UP CARGO TIES COMPRISING SPRING-LOADED CLAMP

CROSS-REFERENCE TO RELATED APPLICATION

This application claims priority to U.S. Provisional Patent Application No. 63/107,526 filed on Oct. 30, 2020 and is incorporated by reference in its entirety as if fully recited herein.

FIELD OF THE INVENTION

The present invention relates to an improved strap winding device. More particularly, the present invention relates to a device which may be selectively and securely clamped to a variety of horizontal and vertical surfaces and utilized to quickly wind-up tie down and other, similar straps.

BACKGROUND AND SUMMARY OF THE INVENTION

Truck drivers and other individuals who are routinely dependent on tie down straps (straps that are utilized to ensure that objects, loads, etc. are held securely in place during transport) are familiar with the fact that managing the tie down straps before and after use can be extremely time consuming. More specifically, manually winding up the tie down straps after use and/or before storage is extremely cumbersome and takes significant time especially considering the great lengths of the tie down straps commonly used in commercial shipping and transport applications. However, failing to wind up the tie down straps after use and/or before storage means the straps often get turned into a tangled mess which must be sorted out before they can be used. Truck drivers need to be time sensitive to be successful: spending significant amounts of time manually winding tie down straps is counterproductive and costly for truck drivers and others who routinely use tie down straps.

A strap winding device as disclosed in U.S. Pat. No. 5,993,127, which is incorporated herein wholly by reference, may be utilized to more effectively wind-up tie down straps. However, the device disclosed in U.S. Pat. No. 5,993,127 lacks the features needed to selectively fasten the strap winding device securely onto varied surfaces in horizontal and vertical positions providing the support and stability needed for optimal strap winding. More specifically, the prior art device comprised two hooks—a stationary upwardly opening hook and a vertically reciprocal downwardly opening hook spring urged downwardly—that were positioned on the device to try and support it when it was in use. The hooks provide limited support and could not be utilized on many surfaces that might otherwise be available when use of the strap winding device was necessary. The hooks are not adequate to secure the device to vertical surfaces. The present invention comprises an adjustable clamp integral with the housing of a strap winding device where the clamp can be selectively open and closed about a variety of surfaces in a secure manner.

A preferred exemplary embodiment of the present invention is a device for strap windwinding comprising a generally hollow housing, a handled rotary torque input shaft, a first end of which projects from a first side of the housing. The input shaft is drivingly coupled to a rotary torque output shaft having a free end projecting from a second side of the housing which is opposite the first side wherein the free end of the output shaft is connected to a tie holding body adapted to selectively receive a strap. When force is applied to the handle connected to the rotary torque input shaft causing it to rotate, the output shaft and connected tie holding body also rotate so that a strap connected to the holding body can be quickly and neatly winded. The shape of the tie holding body preferably permits for the winded strap to be quickly and easily moved off of the tie holding body via sliding the strap in the direction away from the hollow housing.

In a preferred exemplary embodiment, at least one opening defined by a third side of the housing permits for the passage of the first end of a selectively moveable clamp arm having a first end and a second end. The profile of the exemplary clamp arm in this embodiment is generally L-shaped. The first end of the generally L-shaped clamp arm and the third side of the housing operate as jaws which may be placed about a surface and tightened. In the preferred exemplary embodiment, the third side of the housing forms a stationary/fixed jaw while the first end of the generally L-shaped clamp arm is a movable jaw which may be adjusted using the features disclosed herein. The at least one opening defined by the third side of the housing is preferably big enough such that at least part of the generally L-shaped clamp arm can move forward and backward through the opening along an axis (hereinafter referred to as the "clamping axis") that is parallel or approximately parallel with the first and second sides of the housing. The at least one opening defined by the third side of the housing preferably forms a close enough fit about the generally L-shaped clamp arm such that movement of the clamp arm along the axis that is perpendicular to the clamping axis is severely limited, if not prevented all together. The second end of the generally L-shaped clamp arm is positioned within the hollow housing.

In the preferred exemplary embodiment, the generally L-shaped clamp arm comprises a left side and a right side which are mirror images of each other and both of which are generally L-shaped. In the preferred exemplary embodiment, a first clamp arm support member extends between the left side and right side of the generally L-shaped clamp arm's first end. Meanwhile, a second clamp arm support member extends between the left side and right side of the generally L-shaped clamp arm's second end. The second clamp arm support member defines an opening for the receipt and passage of a threaded rod having a first end and a second end. The length of the threaded rod runs generally along the clamping axis. In the preferred exemplary embodiment, a square nut comprising threading which corresponds to the threading on the threaded rod is positioned adjacent to the opening of the second support member such that the opening of the nut which comprises the nuts threading also receives and permits the passage of the threaded rod. In the preferred exemplary embodiment, the nut is sized such that the threading on the nut engages with the threading of the threaded rod when the rod is received by the nut. Moreover, the second clamp arm support member preferably defines a groove, opening, or indentation sized to receive the square nut and to prevent rotation of the nut.

A compression spring having a length of L when no force is being applied to the spring, is preferably positioned about the exterior of a portion of the threaded rod. The compression spring has a first end and a second end such that the second end of the compression spring abuts up against the second clamp arm support member. A compression member is positioned at the first end of the spring along the threaded rod.

In the preferred exemplary embodiment, the first end of the threaded rod is connected to a rotatable handle which protrudes from or is positioned on the exterior of a fourth side of the hollow body. The fourth side of the hollow body is positioned opposite the hollow body's third side. When force is applied to the handle connected to the threaded rod causing it to rotate, the threaded rod also rotates. Preferably, rotation of the threaded rod causes movement of the clamp arm altering the size of a gap existing between the first end of the clamp arm and the side of the housing from which the first end of the clamp arm protrudes. The rotation of the handle in a first direction, preferably causes engagement of the threaded rod with the nut such that the nut and the L shaped clamp arm, which receives the nut at the second clamp arm support member and prevents rotation of the nut, is moved along the threaded rod in the direction heading towards the fourth side of the hollow body. This movement decreases the distance between the moveable jaw and fixed jaw of the device (i.e. decrease of the size of the gap between the first end of the clamp arm and the third side of the housing) such that the device may be connected to a surface positioned between the two jaws. When the handle is moved in this first direction (hereinafter the "clamping direction"), a force is applied to the compression spring along the clamping axis. In the preferred exemplary embodiment, the handle can be moved in the clamping direction until the jaws of the device are either securely and tightly fastened about a surface positioned between the jaws or the jaws are in contact with each other. When the handle is moved in a second direction (hereinafter the "opening direction") the distance between the jaws is increased (i.e. increase of the size of the gap between the first end of the clamp arm and the third side of the housing) such that the device may be removed from a surface to which it was previously connected or up until the distance between the jaws reaches a previously determined maximum distance. The compression spring may assist in opening the device (i.e. increasing the distance between the jaws increasing the size of the gap between the first end of the clamp arm and the third side of the housing) and removing it from surfaces. In a preferred exemplary embodiment, the maximum distance between the two jaws is approximately one inch.

In addition to assisting with the opening of the device, the compression spring may provide other benefits to the device. For example, if the device is dropped such that the jaws undergo an impact from the fall, the compression spring may absorb some of the force from the impact, protecting the device. The compression spring may also assist in preventing the device from getting stuck in the closed position by preventing over-tightening of the device.

In addition to the novel features and advantages mentioned above, other benefits will be readily apparent from the following descriptions of the drawings and exemplary embodiments.

BRIEF DESCRIPTION OF THE DRAWINGS

FIG. 7*a* shows a top sectioned view of an exemplary second clamp arm support member while

DETAILED DESCRIPTION OF EXEMPLARY EMBODIMENT(S)

Figure 1:
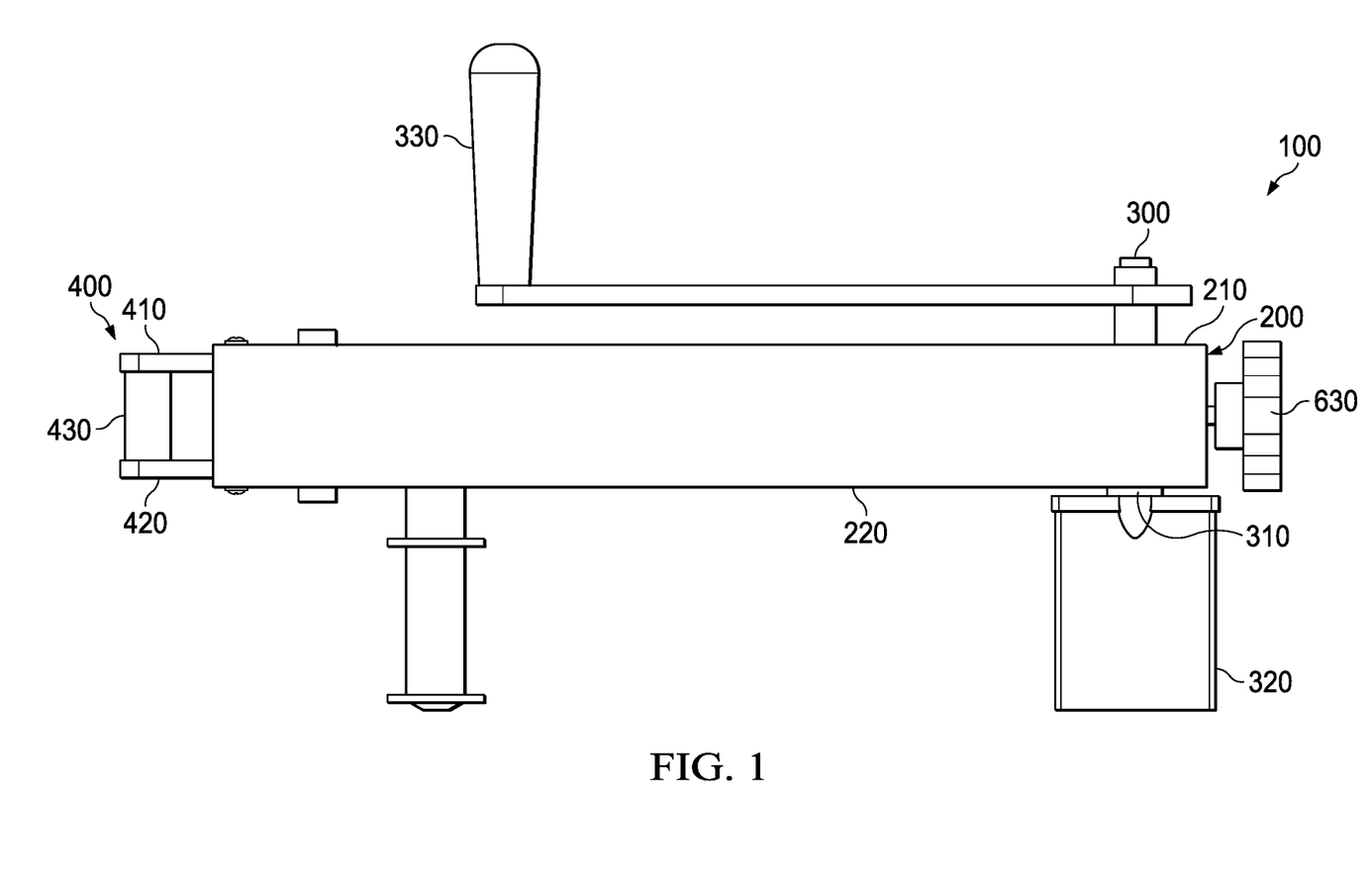
FIG. 1 shows a top plan view of an exemplary strap winding device of the present invention.
Figure 2:
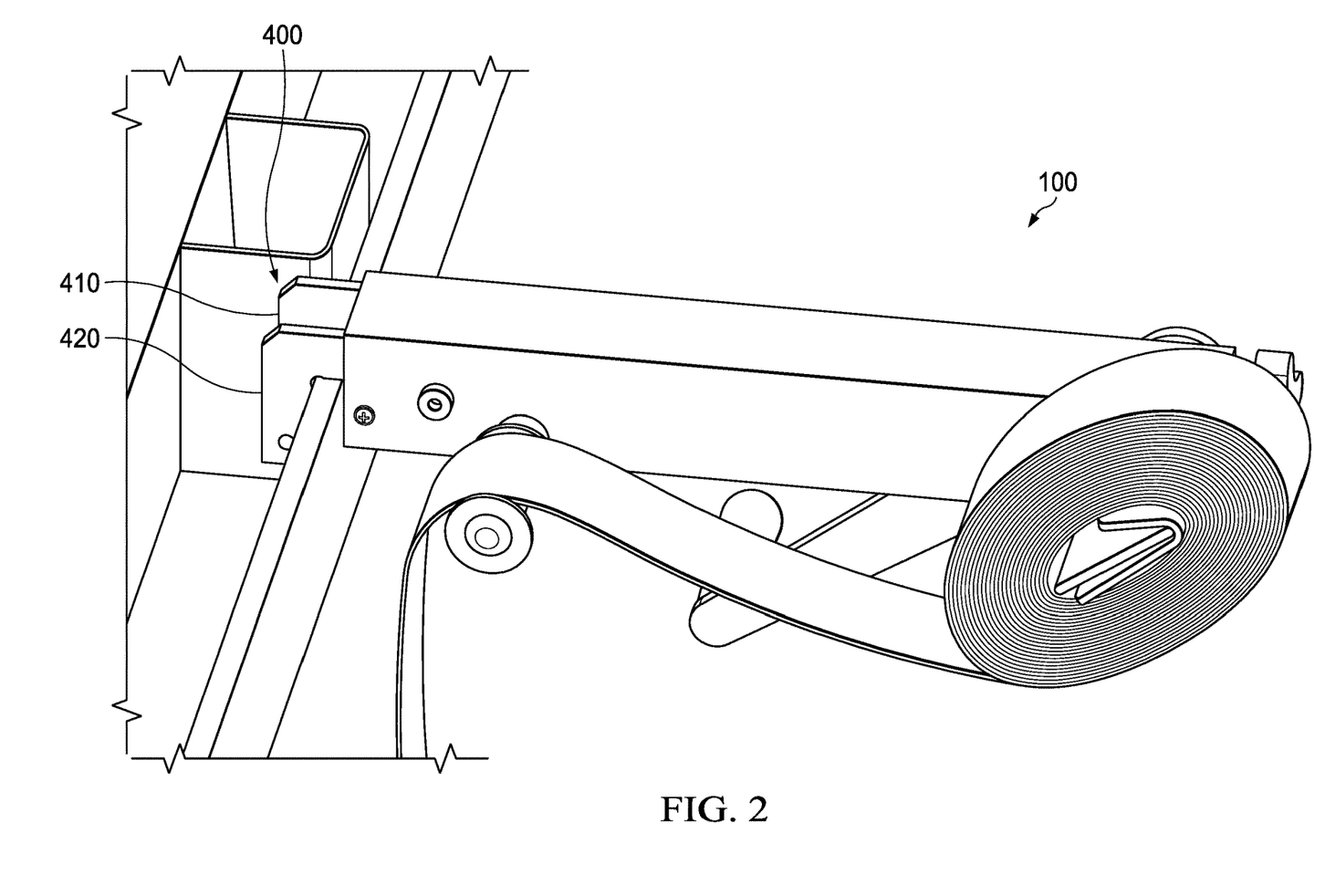
FIG. 2 shows a right-side perspective view of the FIG. 1 exemplary embodiment, shown with the exemplary clamp in a closed position and with a strap being winded up using the device.

A preferred exemplary embodiment of the present invention can be seen in FIG. 1 and is a device for winding cargo ties/straps 100 comprising a generally hollow housing 200, a handled rotary torque input shaft 300, a first end of which projects from a first side 210 of the housing 200. The input shaft is drivingly coupled to a rotary torque output shaft 310 having a free end projecting from a second side 220 of the housing 200 which is opposite the first side 210 wherein the free end of the output shaft 310 is connected to a tie holding body 320 adapted to selectively receive a strap as can be seen in FIG. 2. When force is applied to the handle 330 connected to the rotary torque input shaft 300 causing it to rotate, the output shaft 310 and connected tie holding body 320 also rotate so that a strap/tie selectively connected to the holding body can be quickly and neatly winded. The shape of the tie holding body 320 preferably permits for the winded strap/tie to be quickly and easily moved off of the tie support 320 means via sliding the strap in the direction away from the hollow housing 200.

An exemplary embodiment of the present invention further comprises a clamp having a first jaw and a second jaw, at least one of which is wholly or partially formed by a portion of the housing 200. In such an exemplary embodiment, the distance between the two jaws can be selectively increased and decreased by application of force such that the jaws can be securely connected to various surfaces that can be temporarily positioned between the jaws in order to utilize the strap winding device. Preferably, the jaws of the clamp can be tightened enough such that the weight of the device may be supported when vertical surfaces are utilized between the jaws. In preferred exemplary embodiments, even when the clamping mechanism comprises at least one spring, manual force must be applied to the device to move the movable jaw under normal operation.

Figure 3:
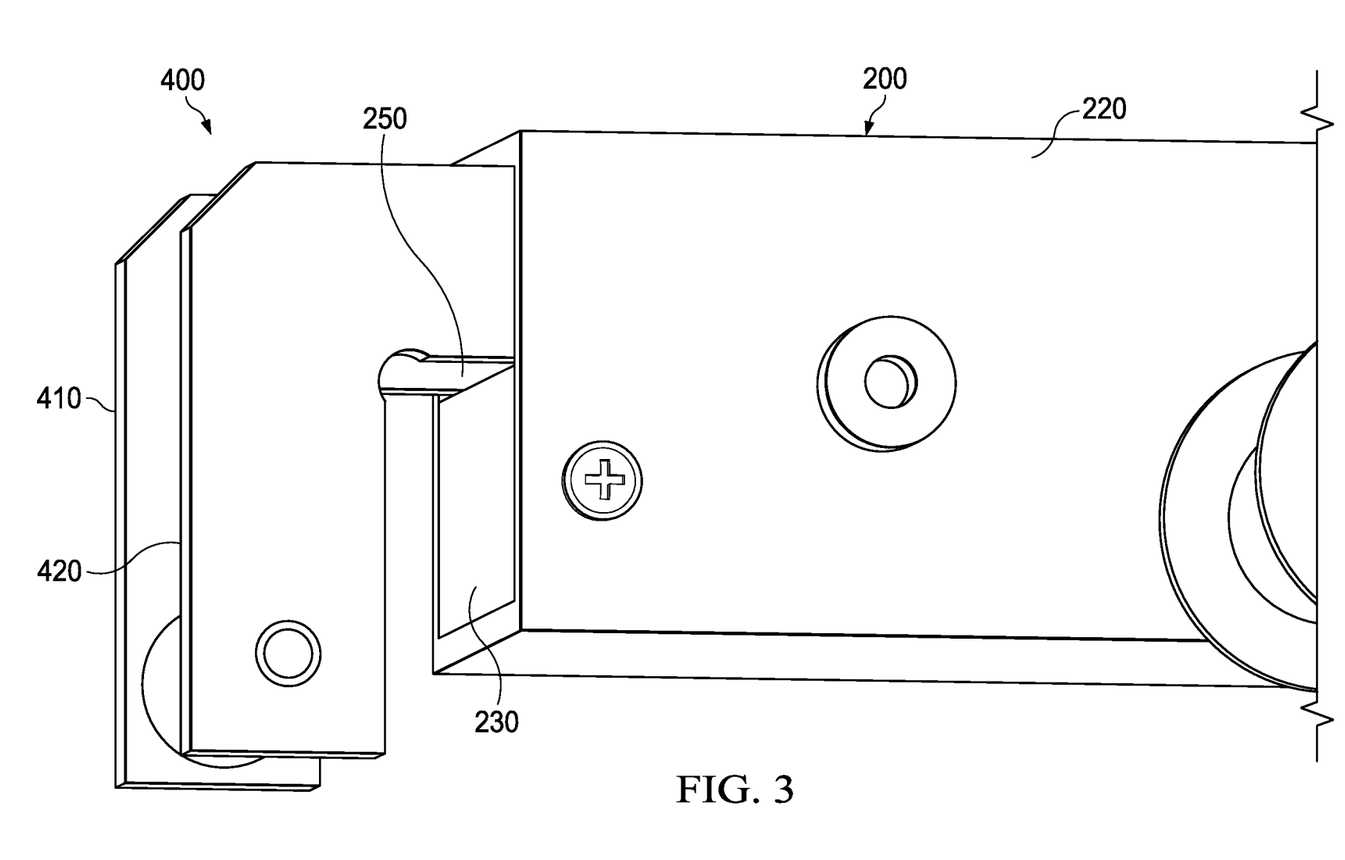
FIG. 3 shows a right-side perspective view of a close up of the exemplary jaws of the embodiment shown in FIGS. 1 and 2.
Figure 4:
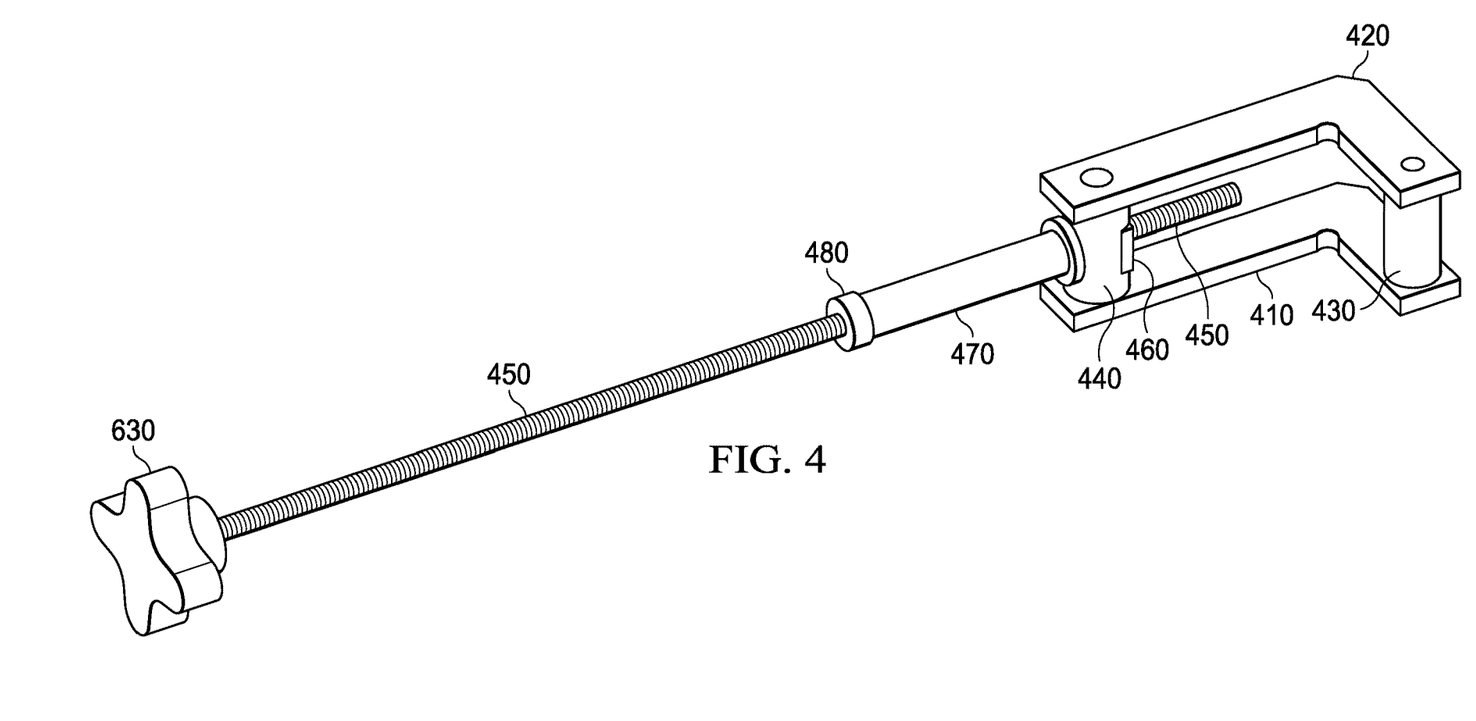
FIG. 4 shows an exemplary embodiment of how an exemplary clamp arm can be connected to the threaded rod of the exemplary embodiments shown in FIGS. 1 through 3 wherein the generally hollow housing, handled rotary torque input shaft, the holding body, and rotary torque output shaft are not shown.
Figure 5:
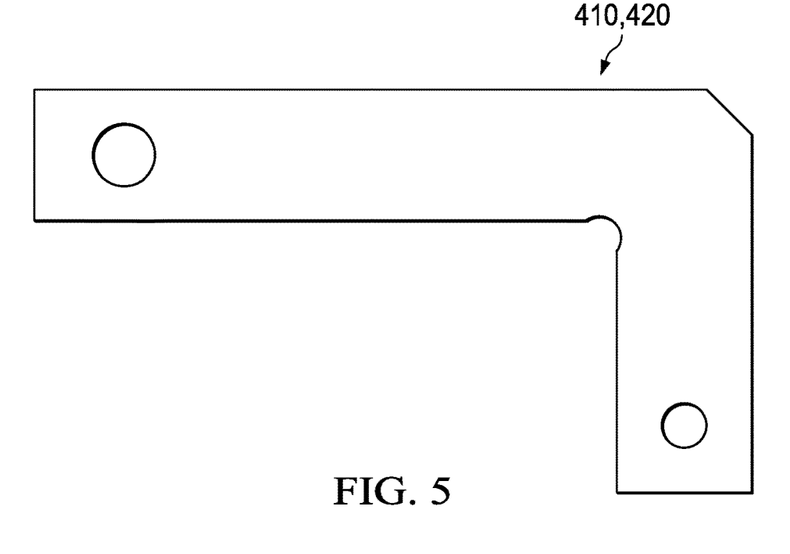
FIG. 5 shows a right-side plan view of the left side and right side of an exemplary clamp arm.
Figure 6:
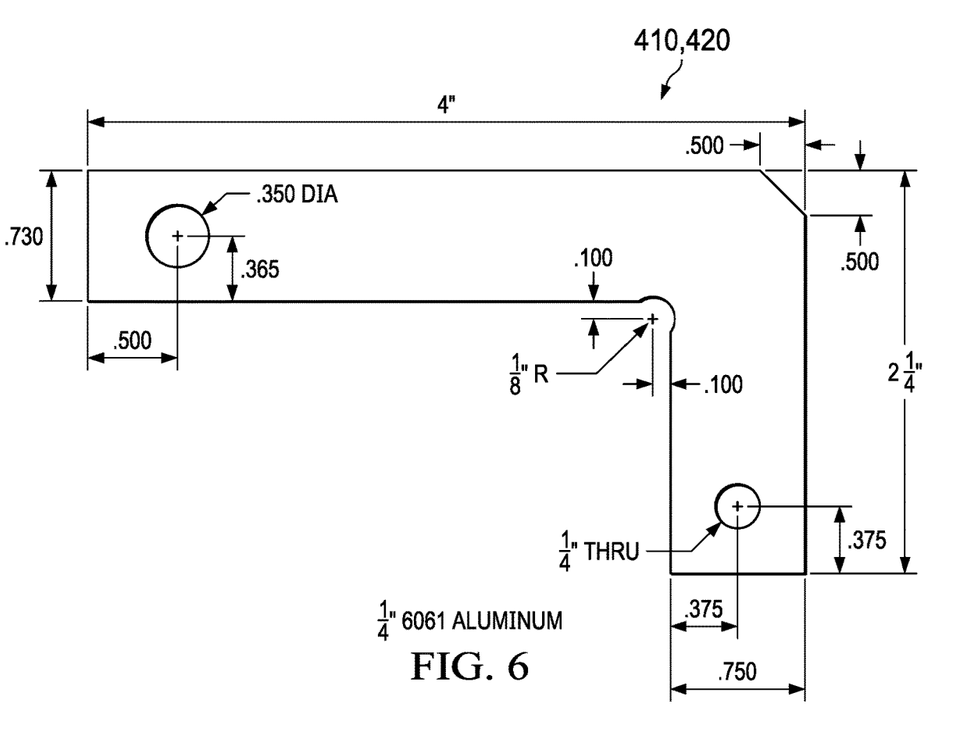
FIG. 6 shows exemplary dimensions of the left side and right-side clamp arm shown in FIG. 5.

In a preferred exemplary embodiment shown in FIG. 3, at least one opening 250 defined by a third side 230 of the housing 200 permits for the passage of the first end of a clamp arm 400 having a first end and a second end. The profile of the clamp arm 400 in the preferred exemplary embodiment is generally L-shaped as can be seen in FIGS. 4, 5, and 6. The first end of the generally L-shaped clamp arm 400 and the third side 230 of the housing 200 operate as jaws which may be placed about various surfaces and tightened. In the preferred embodiment, the third side 230 of the housing 200 forms a stationary/fixed jaw, while the first end of the generally L-shaped clamp arm 400 is a movable jaw which may be adjusted using the features disclosed herein. The at least one opening 250 defined by the third side 230 of the housing 200 is preferably big enough such that at least part of the generally L-shaped clamp arm 400 can move forward and backward through the opening 230 along an axis ((hereinafter referred to as the "clamping axis") that is parallel or approximately parallel with the first side 210 and second side 220 of the housing 200 as shown in the exemplary embodiment of FIG. 3. While the exemplary embodiment shown in FIGS. 1, 2, and 3 has a body 200 that is substantially in the shape of a rectangular prism, it is envisioned that some exemplary embodiments may comprise a body 200 exhibiting one or more sides not parallel with the opposite side. In some preferred embodiments, the clamping axis runs along the same axis as a threaded rod 450 which is received by an opening in a second end of the L-shaped clamp arm 400 and the rotation of which causes movement of the clamp arm 400.

As can also be seen in FIG. 3, in preferred exemplary embodiments, the at least one opening 250 defined by the third side 230 of the housing 200 preferably forms a close enough fit about the generally L-shaped clamp arm 400 such that movement of the clamp arm 400 along the axis that is perpendicular to the clamping axis is severely limited if not prevented all together. The second end of the generally L-shaped clamp arm 400 may be positioned within the hollow housing 200.

Figure 7A:
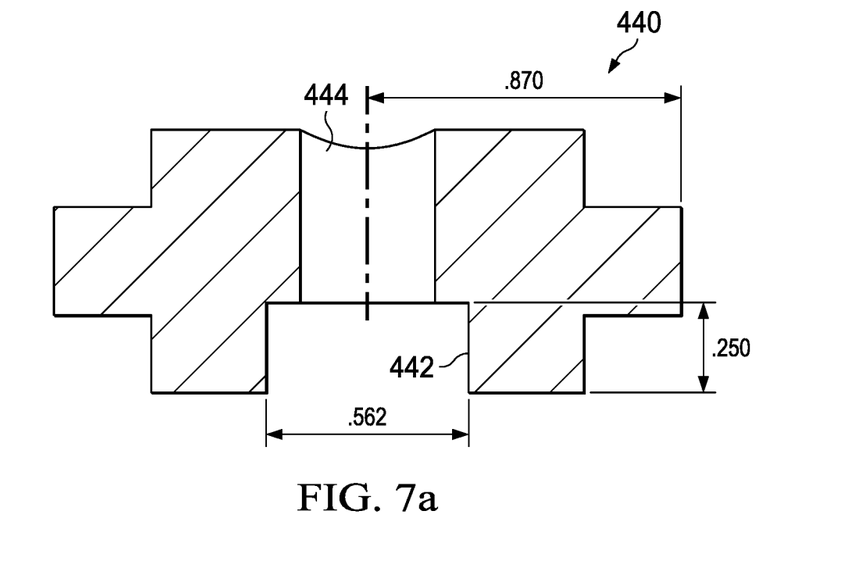
Figure 7B:
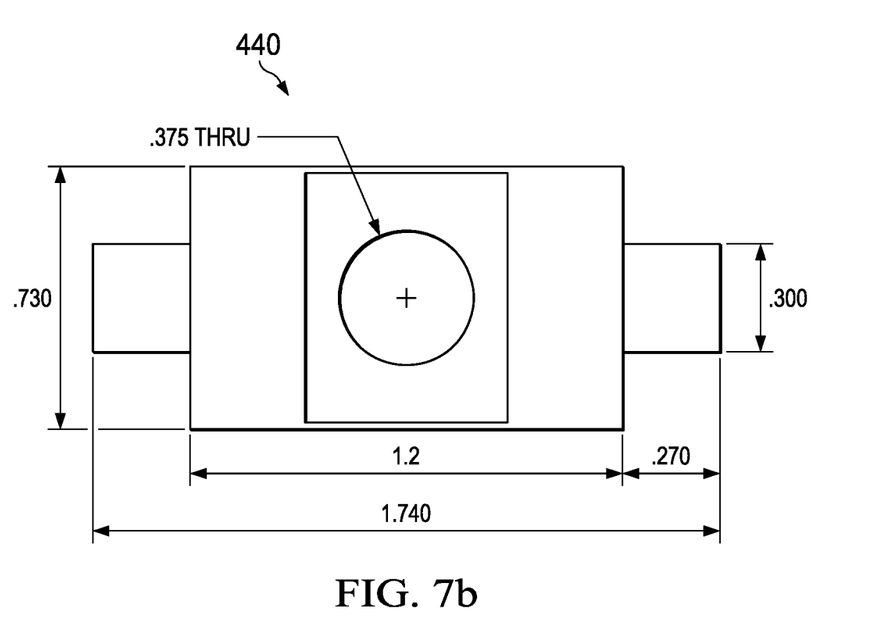
FIG. 7*b* shows a top plan view of the exemplary second clamp arm support member shown in FIG. 7*a*.

In a preferred exemplary embodiment, a generally L-shaped clamp arm 400 comprises a left side 410 and a right side 420 both of which are generally L-shaped as shown in FIG. 5. Exemplary dimensions of the left side 410 and right side 420 of the generally L-shaped clamp arm 400 can be seen in FIG. 6. In a preferred exemplary embodiment shown in FIGS. 1, 3, and 4, a first clamp arm support member 430 preferably extends between the left side 410 and right side 420 of the generally L-shaped clamp arm's 400 first end. Meanwhile, a second clamp arm support member 440 preferably extends between the left side 410 and right side 420 of the generally L-shaped clamp arm's 400 second end. An exemplary second clamp arm support member 440 is shown in FIGS. 7a and 7b. The second clamp arm support member 440 defines an opening 444 for the receipt and passage of a threaded rod 450 having a first end and a second end. The second clamp arm support member 440 also preferably defines an opening 442 to receive and engage with a nut 460. The threaded rod 450 runs generally along the clamping axis in preferred exemplary embodiments. In the preferred exemplary embodiment, a nut 460 having a threaded opening running therethrough has threading which corresponds to and is complimentary to the threading on the threaded rod 450. The nut 460 is preferably positioned adjacent to the opening 442 of the second support member 440 such that the opening of the nut 460 which comprises the nut's 460 threading also receives and permits the passage of the threaded rod 450. In the preferred exemplary embodiment, the nut 460 is sized such that the threading on the nut 460 engages with the threading of the threaded rod 450 when the rod 450 is received by the nut 460. In preferred exemplary embodiments, the shape of the nut 460 and the shape of the opening 442 are complimentary such that the opening 442 prevents the nut 460 from rotating when the threaded rod 450 is rotated. In this preferred embodiment, the nut 460 is positioned along the threaded rod 450 at a position along the length of the threaded rod 450 so that it abuts against the second support member 440 and is received at least partially within the opening 442. In one preferred exemplary embodiment, the nut 460 is square shaped on its exterior and the opening 442 is shaped to catch the corners of the square nut 460 and prevent its rotation when the rod 450 is rotated. The generally L-shaped clamp arm 400 may be made from aluminum in preferred exemplary embodiments.

In another exemplary embodiment, instead of comprising a generally shaped clamp arm that is substantially open between the left side 410 and the right side 420, the clamp arm 400 may be a substantially encased, generally hollow body and/or it could be substantially solid, hi such exemplary embodiments, the clamp arm 400 could define an opening and/or a hollow in its interior for receiving at least part of the threaded rod 450.

In another exemplary embodiment, instead of comprising a nut 460, the second clamp arm support member 440 may define an opening running through the support member 440 wherein at least part of the opening defines threading that corresponds to the threading on the rod 450. In such exemplary embodiments, the opening within the second support member 440 and the rod 450 are preferably sized such that the threading on the rod 450 and the threading on the second support member 440 engage when the rod 450 is received by the second support member 440.

As shown in the preferred exemplary embodiments of FIGS. 1, 2, 3, and 4, the first clamp arm support member 430 and second clamp arm support member 440 are distinct pieces that are mechanically connected to the left 410 and right sides 420 of the generally L-shaped clamp arm 400. However, in other exemplary embodiments, the generally L-shaped clamp arm may be a single, integrated piece. The single integrated clamp arm may include at least one of the first support member 430 and second support member 440.

In the exemplary embodiment shown in FIG. 4, a compression spring 470 having a length of L when no force is being applied to the spring, is preferably positioned about the exterior of a portion of the threaded rod 450. The compression spring 470 has a first end and a second end such that the second end of the compression spring 470 abuts up against the second clamp arm support member 440 (or up against a washer, nut, etc. that may be positioned on or adjacent to the second clamp arm support member 440 in some embodiments). A compression member 480 is positioned at the first end of the spring along the threaded rod 450 and held in a fixed position on the threaded rod 450. The threaded rod 450 is connected to a rotatable handle 630. Note that in FIG. 4, the generally hollow housing, handled rotary torque input shaft, the holding body, and rotary torque output shaft are not shown.

In a preferred exemplary embodiment, as shown in FIG. 1 and FIG. 4, the first end of the threaded rod is connected to a rotatable handle 630 which protrudes from or is positioned on the exterior of a fourth side of the hollow body 200. The fourth side of the hollow body is positioned opposite the hollow body's third side 230. When force is selectively applied to the handle 630 connected to the threaded rod 450 causing it 630 to rotate, the threaded rod 450 also rotates. This rotation, causes engagement of the threaded rod 450 with the nut 460 (or with the clamp arm support member or clamp arm in other exemplary embodiments) such that the nut 460 and the L-shaped clamp arm 400 (via the pushing force applied by the nut 460), is moved along the threaded rod 450 in the direction heading towards the fourth side of the hollow body 200. More specifically, when the threaded rod 450 is rotated, it engages with the nut 460, but because the nut 460 is prevented from spinning by opening 442, the rotation of the threaded rod 450 causes the threaded rod to move in the direction of the rotatable handle 630. Because the second clamp arm support member 440 is between the nut and the handle 630, it is also moved towards the handle 630. This movement decreases the distance between the moveable jaw and fixed jaw 230 of the device 100 such that the device 100 may be connected to a variety of surfaces that can be positioned between the two jaws. When the handle 630 is moved in this first direction (hereinafter the "clamping direction"), a force is applied to the compression spring 470 along the clamping axis when the spring 470 is pushed against the compression member 480, in a preferred exemplary embodiment, the handle 630 can be moved in the clamping direction until the jaws of the device are either securely and tightly fastened about a surface temporarily positioned between the jaws or the jaws are in contact with each other.

Preferably, when the handle 630 is moved in a second direction (hereinafter the "opening direction") the distance between the jaws is increased such that the device 100 may be removed from a surface to which it was previously connected or up until the distance between the jaws reaches a previously determined maximum distance. The compression spring 470 may assist in opening the device 100 and removing it from surfaces. But, in preferred exemplary embodiments, manual force must be applied to handle 630 to increase or decrease the distance between the jaws under normal operational circumstances. In a preferred exemplary embodiment, the maximum distance between the two jaws is approximately one inch.

In addition to assisting with the opening of the device, the compression spring 470 may provide other benefits to the device. For example, if the device is dropped such that the jaws undergo an impact from the fall, the compression spring 470 may absorb some of the force from the impact, protecting the device. The compression spring 470 may also assist in preventing the device from getting stuck in the closed position by preventing over-tightening of the device.

Some exemplary embodiments of the present invention may comprise a cargo tie adapted to be received by the cargo tie holding body 320 of the winding device. In some embodiments, the cargo tie might comprise a J-shaped hook as disclosed in U.S. Pat. No. 5,993,127 which is selectively received by and engaged by the cargo tie holding body 320 in order to neatly wind the tie. In other exemplary embodiments, the cargo tie holding body 320 may comprise a clamp or define an opening which selectively receives and is able to temporarily hold a cargo tie in place while using the device 100.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A device for winding cargo ties comprising:
a generally hollow housing;
a handled rotary torque input shaft, a first end of which projects from the housing;
a holding body rotatably positioned on the housing said holding body adapted to selectively receive a cargo tie;
a rotary torque output shaft coupled to the input shaft and the holding body such that the application of force to the input shaft handle causes the output shaft to rotate the holding body;
a first opening defined by a side of the housing;
a moveable clamp arm having a generally L-shaped profile, wherein:
a first end of the clamp arm protrudes from the first opening and a second end of the clamp arm is disposed within the housing;
the moveable clamp arm comprises a left side and a right side that are mirror images of each other; and
the claim arm further comprises:
a first clamp arm support member extending between the left and right sides of the clamp arm at the first end of the clamp arm; and
a second clamp arm support member extending between the left and right sides of the clamp arm at the second end of the clamp arm wherein the second clamp arm support member defines the second opening;
a rotatable threaded rod disposed at least partially within the housing, part of the threaded rod being received by a second opening that is defined by the second end of the clamp arm wherein rotation of the threaded rod causes movement of the clamp arm altering the size of a gap existing between the first end of the clamp arm and the side of the housing from which the first end of the clamp arm protrudes.

2. The device of claim 1 further comprising:
a nut positioned about the threaded rod, the nut having threading that engages with threading on the threaded rod;
a compression spring positioned about the threaded rod; and
a compression body positioned about the threaded rod abutting up against a first end of the compression spring;
wherein the second end of the clamp arm is adapted to prevent the rotation of the nut and the movement of the clamp arm is facilitated at least partially by engagement of the nut with the threaded rod upon rotation of the threaded rod.

3. The device of claim 2 wherein the first end of the clamp arm and the end of the housing from which the first end of the clamp arm protrudes form jaws defining an opening that can be adjusted for selective attachment onto a variety of surfaces by rotating the threaded rod.

4. The device of claim 3 wherein the compression spring is adapted to make increasing the distance between the jaws easier.

5. The device of claim 2 wherein the second end of the clamp arm is adapted to prevent rotation of the nut.

6. The device of claim 1 wherein the first end of the clamp arm and the end of the housing from which the first end of the clamp arm protrudes form jaws define a gap that can be adjusted for selective attachment onto a variety of surfaces by rotating the threaded rod.

7. The device of claim 6 further comprising a handle connected to a first end of the threaded rod such that rotation of the handle causes corresponding rotation of the threaded rod and an adjustment of the gap defined by the jaws.

8. The device of claim 7 wherein the handle can be rotated in a first direction until the jaws are securely and tightly fastened about a surface selectively positioned between the jaws or until the jaws are in contact with each other.

9. The device of claim 8 wherein the handle can be rotated in a second direction until the distance of the gap between the jaws reaches a previously determined maximum distance.

10. A device for winding cargo ties comprising:
- a generally hollow housing;
- a handled rotary torque input shaft, a first end of which projects from a first side of the housing;
- a cargo tie holding body rotatably positioned on a second side of the housing which is opposite of the housing's first side;
- a rotary torque output shaft coupled to the input shaft and the cargo tie holding body such that the application of force to the input shaft handle causes the output shaft to rotate the cargo tie holding body;
- an opening defined by a third side of the generally hollow housing;
- a moveable clamp arm having a generally L-shaped profile, a first end which protrudes from the opening, and a second end which is disposed within the housing;
- a rotatable threaded rod disposed at least partially within the housing such that part of the threaded rod is received by an opening defined by the second end of the clamp arm;
- a nut positioned about the threaded rod and in contact with the second end of the clamp arm, the nut having threading that engages with threading on the threaded rod;
- a compression spring positioned about the threaded rod; and
- a compression body positioned about the threaded rod abutting up against a first end of the compression spring;
- wherein rotation of the threaded rod causes movement of the clamp arm along a clamping axis altering the size of a gap existing between the first end of the clamp arm and the side of the housing from which the first end of the clamp arm protrudes.

11. The device of claim 10 wherein the second end of the clamp arm is adapted to prevent the rotation of the nut.

12. The device of claim 11 wherein the second end of the clamp defines an opening adapted to receive at least part of the nut and prevent the rotation of the nut.

13. The device of claim 11 wherein the moveable clamp arm comprises a left side and a right side that are mirror images of each other and the clamp arm further comprises:
- a first clamp arm support member extending between the left and right sides of the clamp arm at the first end of the clamp arm; and
- a second clamp arm support member extending between the left and right sides of the clamp arm at the second end of the clamp arm wherein the second clamp arm support member defines the opening of the clamp arm that receives the threaded rod.

14. The device of claim 11 wherein the moveable clamp arm comprises a left side and a right side that are mirror images of each other and the clamp arm further comprises:
- a first clamp arm support member extending between the left and right sides of the clamp arm at the first end of the clamp arm; and
- a second clamp arm support member extending between the left and right sides of the clamp arm at the second end of the clamp arm wherein the second clamp arm support member defines the opening of the clamp arm that receives the threaded rod and is adapted to prevent the rotation of the nut.

15. The device of claim 14 wherein the second end of the clamp defines an opening adapted to receive at least part of the nut and prevent the rotation of the nut.

16. The device of claim 11 wherein the compression spring is adapted to assist in increasing the size of a gap existing between the first end of the clamp arm and the side of the housing.

17. The device of claim 11 wherein the opening defined by the third side of the housing and through which the clamp arm passes, is sized to prevent significant movement of the clamp arm in a direction perpendicular to a clamping axis that runs parallel to the threaded rod.

18. A device for winding cargo ties comprising:
- a generally hollow housing;
- a handled rotary torque input shaft, a first end of which projects from a first side of the housing;
- a cargo tie holding body rotatably positioned on a second side of the housing which is opposite of the housing's first side;
- a rotary torque output shaft coupled to the input shaft and the cargo tie holding body such that the application of force to the input shaft handle causes the output shaft to rotate the cargo tie holding body;
- an opening defined by a third side of the generally hollow housing;
- a moveable clamp arm a first end of which protrudes from the opening, and a second end which is disposed within the housing;
- a threaded rod disposed at least partially within the housing such that part of the threaded rod is in contact with the second end of the clamp arm;
- a nut positioned about the threaded rod, the nut having threading that engages with threading on the threaded rod;
- a compression spring positioned about the threaded rod;
- a compression body positioned about the threaded rod abutting up against a first end of the compression spring; and
- a handle connected to the threaded rod at the exterior of the generally hollow housing;
- wherein application of force to the handle causes movement of the threaded rod and the clamp arm along a clamping axis altering the size of a gap existing between the first end of the clamp arm and the side of the housing from which the first end of the clamp arm protrudes;
- wherein the second end of the clamp arm is adapted to prevent the rotation of the nut; and
- wherein the movement of the clamp arm is facilitated at least partially by engagement of the nut with the threaded rod upon rotation of the threaded rod.

19. The device of claim 18 wherein the moveable clamp arm comprises a left side and a right side that are mirror images of each other and the clamp arm further comprises:
- a first clamp arm support member extending between the left and right sides of the clamp arm at the first end of the clamp arm; and
- a second clamp arm support member extending between the left and right sides of the clamp arm at the second end of the clamp arm wherein the second clamp arm support member defines an opening of the clamp arm that receives the threaded rod and is further adapted to prevent the rotation of a nut that is positioned about the rod.

* * * * *